E. V. HEINS.
POWDER BOX.
APPLICATION FILED DEC. 6, 1909.
980,893.
Patented Jan. 3, 1911.
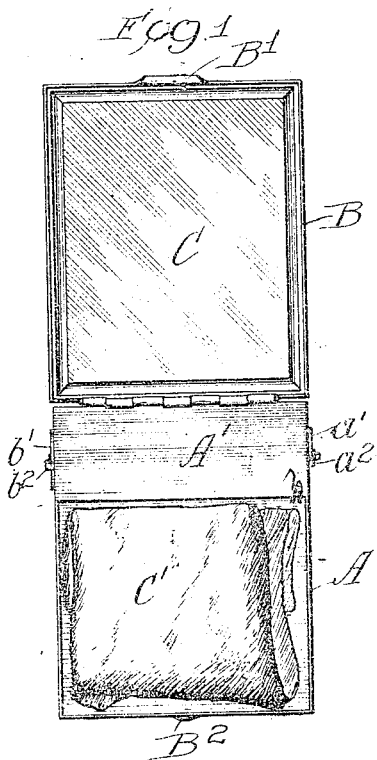
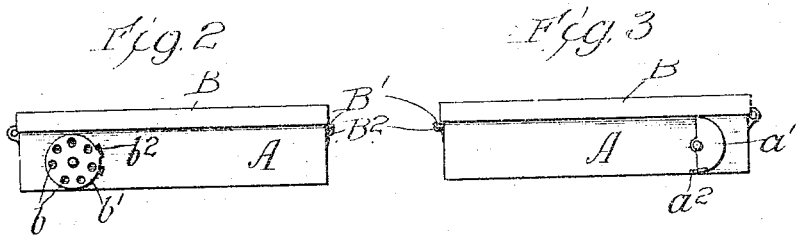
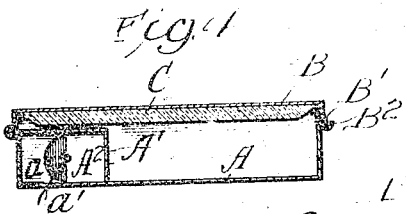
Witnesses
R. A. White.
H. R. L. White.
Inventor
Ethel V. Heins.
By [signature] Atty.

UNITED STATES PATENT OFFICE.

ETHEL V. HEINS, OF CHICAGO, ILLINOIS.

POWDER-BOX.

980,893.   Specification of Letters Patent.   Patented Jan. 3, 1911.

Application filed December 6, 1909. Serial No. 531,660.

*To all whom it may concern:*

Be it known that I, ETHEL V. HEINS, a citizen of the United States, residing at Chicago, in the county of Cook and State of Illinois, have invented certain new and useful Improvements in Powder-Boxes, of which the following, taken in connection with the drawing, is a description.

My invention has for its object the production of a powder box so constructed and arranged that it occupies a minimum of space, and may be conveniently carried in a purse or small pocket. This box is provided with a separate compartment in which the powder is contained, also a compartment for the powder rag or chamois skin, and a mirror in the cover of the box, so that it forms a complete toilet article of the class described.

In the drawings I have illustrated my invention in what I now consider the preferred form of construction, although the details thereof may be modified without departing from the spirit of the invention as defined by the scope of the claim, and in these drawings, Figure 1 is a plan view of the box with the cover opened; Fig. 2 is a side elevation thereof illustrating the discharge opening in the powder box; Fig. 3 is a view of the opposite side of the box, illustrating the opening through which the compartment is filled with powder, and Fig. 4 is a longitudinal sectional view of the box.

In the drawings A illustrates a box of any shape found convenient which may be formed of metal, or any other material suitable for the purpose and ornamented in any manner desired. Arranged inside of said box A is an angular shaped partition A′, which in inclosed entirely on the inside of the box, but which forms in connection with the bottom, sides and one end of the box A a compartment having openings at each end thereof through the sides of the box A.

$a$ is an opening arranged in one end of the compartment A², through which said compartment may be filled with powder and the opening closed by the cover $a'$ which is pivotally secured to the side of the box A. A stop $a^2$ projects from the box to limit the movement of the cover, said cover being kept in closed position by frictional engagement with the side of the box. The opposite end of the compartment is provided with a plurality of small apertures $b$ through which powder contained in said compartment may be sifted, and these apertures are closed by a cover $b'$, which is pivotally secured to the side of the box A. This cover $b'$ is provided with apertures coincident with the apertures $b$ in the box. A stop $b^2$ projects from the side of the box A to limit the movement of the cover $b'$.

The box A is provided with a cover B preferably hinged at one end thereof to the edge of the box A as shown and provided with a clasp B′ upon the opposite end thereof which takes over a boss or projection B² extending from the corresponding end of the box, whereby the cover is held in closed position. Suitably arranged within the cover is a mirror C which may be held in position in any desired manner, and which closes inside of the box as shown in Fig. 4. A powder rag or chamois skin C′ is folded and placed inside of the box as shown in Fig. 1.

I claim:—

A toilet receptacle comprising a rectangular box having a cover secured thereto, a transversely-extending angular-shaped partition mounted in the box at one end thereof and forming in connection with the bottom and the side walls and an end wall of the box a closed compartment within the box at one end thereof, one of the side walls of said box provided at one end with an opening whereby said compartment can be filled, a cover pivotally secured to the apertured side wall for closing said opening, the other side wall of said box provided at one end with a plurality of openings constituting outlets for said compartment, a perforated cover pivotally-connected to the last mentioned side wall and adapted to open and close said plurality of openings, peripheral means on the side walls for limiting the movement of said covers, said angular-shaped partition having the top thereof flush with the top edge of the box, and of a length substantially equal to the width of the box and further providing in connection with the other end wall and a portion of the side walls and the bottom of the box an open chamber at the side of said closed compartment.

In testimony whereof I have signed this specification in the presence of two subscribing witnesses.

ETHEL V. HEINS.

Witnesses:
A. V. WELDON,
WELLS GOODHUE.